(12) United States Patent
Oda et al.

(10) Patent No.: US 7,196,756 B2
(45) Date of Patent: Mar. 27, 2007

(54) DISPLAY

(75) Inventors: Nobuhiko Oda, Hashima (JP);
Tsutomu Yamada, Mizuho (JP);
Yasushi Miyajima, Gifu (JP); Shinji Ogawa, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 84 days.

(21) Appl. No.: 10/809,909

(22) Filed: Mar. 26, 2004

(65) Prior Publication Data
US 2004/0189905 A1   Sep. 30, 2004

(30) Foreign Application Priority Data
Mar. 28, 2003   (JP)   ............... 2003-090158

(51) Int. Cl.
*G02F 1/1335* (2006.01)
(52) U.S. Cl. ........................... 349/114; 349/44
(58) Field of Classification Search ............... 349/114, 349/110, 44, 111
See application file for complete search history.

(56) References Cited

U.S. PATENT DOCUMENTS

| 6,330,047 B1 | 12/2001 | Kubo et al. | |
| 6,879,359 B1* | 4/2005 | Kikkawa et al. | 349/113 |
| 2001/0020991 A1 | 9/2001 | Kubo et al. | |
| 2002/0033918 A1 | 3/2002 | Shigeno et al. | |
| 2002/0093609 A1 | 7/2002 | Baek et al. | |
| 2002/0196517 A1 | 12/2002 | Nimura | |
| 2004/0179157 A1* | 9/2004 | Kim et al. | 349/114 |
| 2004/0183970 A1* | 9/2004 | Niiya | 349/114 |

FOREIGN PATENT DOCUMENTS

| EP | 1 279 995 A2 | 1/2003 |
| JP | 2002-098951 | 4/2002 |
| JP | 2002-98951 | 4/2002 |
| KR | 200214993 | 2/2002 |
| KR | 2002-92824 | 12/2002 |

OTHER PUBLICATIONS

Narutaki, Yozo., et al. " Highly efficient transflective TFT-LCDs with novel structure." Sharp Corporation, Mobile Display Laboratories, IDW '02, pp. 299-302.
Shimizu Masahiro., et al. ""HR-TFT/Advanced TFT" for Cellular Phones."" pp. 22-26.
Narutaki, Yozo., et al. "Highly efficient transflective TFT-LCDs with novel structure." Sharp Corporation, Mobile Display Laboratories, IDW '02, pp. 299-302.
Office Action dated Dec. 1, 2005 with English Translation for corresponding Korean Patent Application No. 10-2004-20813.

* cited by examiner

*Primary Examiner*—Toan Ton
(74) *Attorney, Agent, or Firm*—McDermott Will & Emery LLP

(57) ABSTRACT

According to the present invention, there is provided a display, in which the degradation of a displaying quality caused by a turbulently reflected light beam at the time of exposure can be suppressed. The display according to the present invention having a reflective region and a transmissive region comprises a projecting insulating layer formed in a region corresponding to the reflective region on a substrate and a light shielding layer formed under the projecting insulating layer and formed to extend at least up to a region in which a side end of the projecting insulating layer is located.

23 Claims, 10 Drawing Sheets

DISPLAY

BACKGROUND OF THE INVENTION

1. Field of the Invention

The present invention relates to a display and, more particularly, to a display having a reflective region and a transmissive region.

2. Description of the Background Art

There has been conventionally known a transflective type liquid crystal display having two functions of a transmissive type, in which a light beam incident into a liquid crystal layer is allowed to pass only in one direction, and a reflective type, in which a light beam incident into a liquid crystal layer is reflected. Such a transflective type liquid crystal display is disclosed in, for example, Japanese Patent Application Publication No. 2002-98951.

FIG. 17 is a plan view showing the structure of a transflective type liquid crystal display having a projecting insulating film (i.e., a planarization film) in the prior art; and FIG. 18 is a cross-sectional view taken along a line 190—190, showing the display in the prior art shown in FIG. 17.

As shown in FIG. 18, in the transflective type liquid crystal display in the prior art, an active layer 102 is formed in a predetermined region corresponding to a reflective region 160a on a glass substrate 101 having a buffer layer 101a formed thereon. In the active layer 102, a source region 102a and a drain region 102b are formed to hold a channel region 102c therebetween. Furthermore, a gate electrode 104 is formed on the channel region 102c having a gate insulating film 103 interposed therebetween. Moreover, an auxiliary capacitance line 105 is formed in a predetermined region on the gate insulating film 103 corresponding to the reflective region 160a. An auxiliary capacitance consists of an auxiliary capacitance region 102d of the active layer 102, the gate insulating film 103 and the auxiliary capacitance line 105. As shown in FIG. 17, the gate electrode 104 is connected to a gate line 104a.

As shown in FIG. 18, an interlayer insulating film 106 having contact holes 106a and 106b is formed to cover a thin film transistor and the auxiliary capacitance. A source electrode 107 and a drain electrode 108 are formed on the interlayer insulating film 106 via the contact holes 106a and 106b in such a manner as to be electrically connected to the source region 102a and the drain region 102b, respectively. As shown in FIG. 17, the drain electrode 108 is connected to a drain line 108a. As shown in FIG. 18, a planarization film 109 having openings 109a and 109b is formed in a projecting cross section on the interlayer insulating film 106. As shown in FIG. 17, the opening 109a is formed to surround a transmissive region 160b while the opening 109b is formed in a region corresponding to the source electrode 107. A side end 104b of the gate line 104a and a side end 105a of the auxiliary capacitance line 105 are formed in a region under the planarization film 109 separated with a predetermined interval from a region in which a side end 109c of the opening 109a is located.

Additionally, as shown in FIG. 18, a reflective electrode 110 is formed in a region corresponding to the reflective region 160a in such a manner as to be electrically connected to the source electrode 107 via the opening 109b and extend along the upper surface of the planarization film 109 and the side surface of the opening 109a. Furthermore, an opening 110a is formed in a region corresponding to the transmissive region 160b in the reflective electrode 110. A transparent electrode 111 is formed on the interlayer insulating film 106 located in the reflective electrode 110 and the opening 110a. The transparent electrode 111 and the reflective electrode 110 constitute a pixel electrode.

Moreover, a substrate (i.e., an opposite substrate) 112 is disposed at a position opposite to the substrate 101. A color filter 113, which exhibits each color of red, green and blue, is formed on the substrate 112, and further, a black matrix 114 is embedded in a space defined between the color filters 113. An opposite electrode 115 is formed on the color filter 113 and the black matrix 114. An aligning film, not shown, is formed on each of the transparent electrode 111 and the opposite electrode 115. A liquid crystal layer 116 is filled between the two aligning films.

When the planarization film 109 is exposed to a light beam in the case where the opening 109a is formed in the region corresponding to the transmissive region 160b by using photolithography in the above-described transflective type liquid crystal display in the prior art, a light beam transmitting the substrate 101 may be turbulently reflected on a substrate stage, not shown, of an exposing device. In this case, since the region in which the side end 109c is formed at the opening 109a is irradiated with the turbulently reflected light beam during the exposure, a portion, into which the turbulently reflected light beam enters, may be accidentally removed at the time of development. Consequently, as shown in FIG. 17, there has caused an inconvenience that a recess 109d due to the turbulently reflected light beam is formed at the side end 109c of the opening 109a, and further, that a portion of the reflective electrode 110 formed on the side end 109c of the planarization film 109 also is recessed. As a result, an image reflecting the recess of the reflective electrode 110 is displayed on a screen, thereby raising a problem of degradation of a displaying quality.

SUMMARY OF THE INVENTION

An object of the present invention is to provide a display, in which the degradation of a displaying quality caused by a turbulently reflected light beam at the time of exposure can be suppressed.

A display according to a first aspect of the present invention having a reflective region and a transmissive region comprises a projecting insulating layer formed in a region corresponding to the reflective region on a substrate and a light shielding layer formed under the projecting insulating layer and formed to extend at least up to a region in which a side end of the projecting insulating layer is located.

A display according to a second aspect of the present invention having a substrate, a projecting insulating layer on the substrate, a first electrode on the substrate, a second electrode on the first electrode and a liquid crystal layer held between the first electrode and the second electrode comprises a transmissive region, in which the first electrode is made of transparent material, and the first electrode and the second electrode are separated from each other with a first distance; a reflective region including a reflector on the projecting insulating layer, in which the first electrode and the second electrode are separated from each other with a second distance shorter than the first distance due to the projecting insulating layer; and a light shielding layer interposed between the substrate and the projecting insulating layer; wherein the light shielding layer extends at least up to an end on the side of the transmissive region of the projecting insulating layer.

In the displays according to the first and second aspects, as described above, it is possible to suppress a region, in which the side end of the projecting insulating layer is formed, from being irradiated with a light beam, which transmits the substrate and is turbulently reflected on a substrate stage, by the light shielding layer, when a photosensitive insulating layer is exposed to a light beam in the case where the projecting insulating layer is formed in the region corresponding to the reflective region on the substrate by using photolithography by forming the light shielding layer under the projecting insulating layer to extend up to the region in which the side end of the projecting insulating layer formed in the region corresponding to the reflective region on the substrate. As a consequence, it is possible to suppress a part of the side end of the projecting insulating layer from being removed in developing an image, and therefore, it is possible to suppress a recess due to the turbulently reflected light beam from being formed at the side end of the projecting insulating layer. Consequently, a portion of a reflecting film to be formed at the side end of the projecting insulating layer can be suppressed from being formed into the recess due to the turbulently reflected light beam, thereby suppressing an image reflecting the recess of the reflecting film from being displayed on a screen. As a result, it is possible to suppress the degradation of a displaying quality due to the turbulently reflected light beam at the time of exposure to the light beam.

DESCRIPTION OF THE PREFERRED EMBODIMENTS

Preferred embodiments according to the present invention will be described below in reference to the accompanying drawings.

First Embodiment

Referring to FIGS. 1 to 5, a liquid crystal display in a first preferred embodiment includes two regions, that is, a reflective region 60a and a transmissive region 60b inside of one pixel. A reflective electrode 10 is formed in the reflective region 60a while no reflective electrode 10 is formed in the transmissive region 60b. Consequently, an image can be displayed in the reflective region 60a by allowing a light beam in a direction indicated by an arrow A in FIG. 5 to be reflected. In the meantime, an image can be displayed in the transmissive region 60b by allowing a light beam in a direction indicated by an arrow B in FIG. 5 to transmit therethrough.

Figure 1:
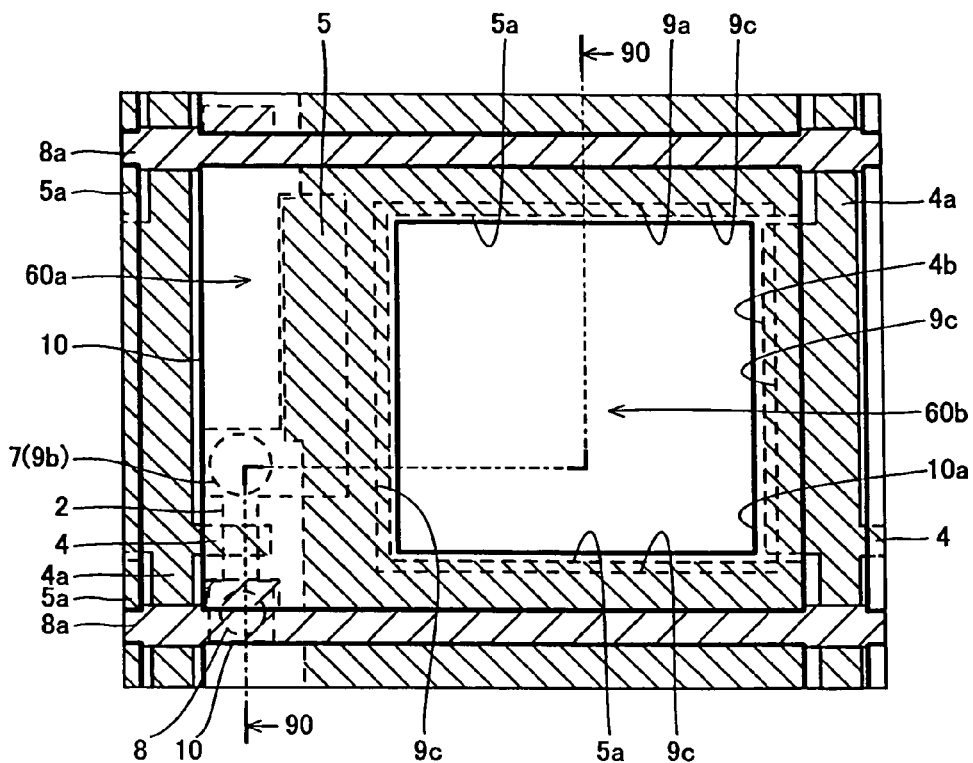
FIG. 1 is a plan view showing the structure of a transflective type liquid crystal display in a first preferred embodiment according to the present invention.
Figure 5:
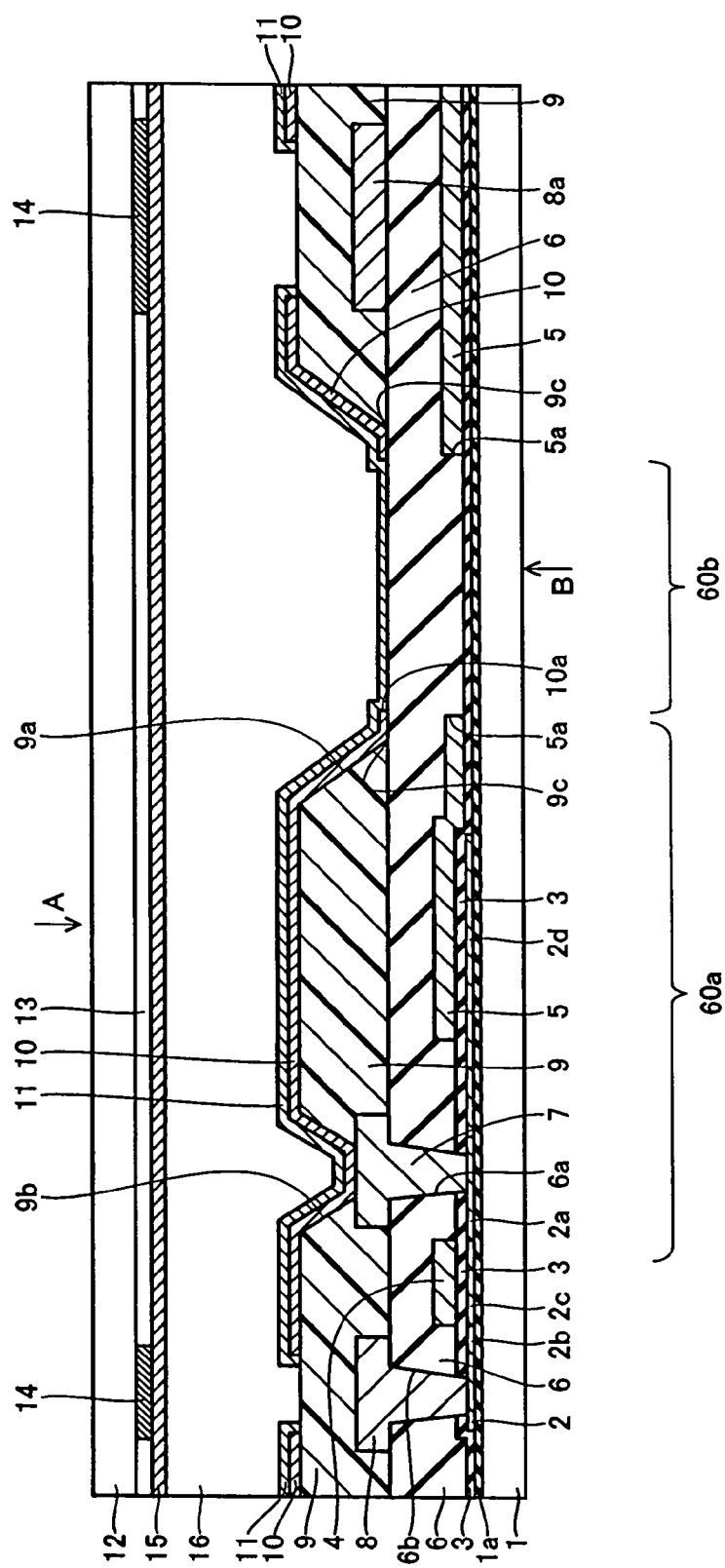
FIG. 5 is a cross-sectional view taken along a line 90—90 in the display in the first preferred embodiment shown in FIG. 1.

As shown in FIG. 5, an active layer 2 made of non single crystal silicon or amorphous silicon in a thickness of about 30 nm to about 50 nm is formed in a predetermined region corresponding to the reflective region 60a on a glass substrate 1 provided with a buffer layer 1a made of an $SiN_x$ film and an $SiO_2$ film. The glass substrate 1 is one example of "a substrate" according to the present invention. A source region 2a and a drain region 2b are formed on the active layer 2 in such a manner as to hold a channel region 2c therebetween. A gate electrode 4 made of an Mo layer is formed in a thickness of about 200 nm to about 250 nm on the channel region 2c via a gate insulating film 3 formed of a laminate film consisting of an $SiN_x$ film and an $SiO_2$ film in a thickness of about 80 nm to about 150 nm. The source region 2a, the drain region 2b, the channel region 2c, the gate insulating film 3 and the gate electrode 4 constitute a thin film transistor (TFT) of a top gate type. Furthermore, as shown in FIG. 1, the gate electrode 4 is connected to a gate line 4a made of the same layer as that of the gate electrode 4.

Moreover, as shown in FIG. 5, an auxiliary capacitance line 5 made of an Mo layer in a thickness of about 200 nm to about 250 nm is formed in a predetermined region on the gate insulating film 3 corresponding to the reflective region 60a. An auxiliary capacitance consists of an auxiliary capacitance region 2d of the active layer 2, the gate insulating film 3 and the auxiliary capacitance line 5.

As shown in FIG. 5, an interlayer insulating film 6 having contact holes 6a and 6b, formed of a laminate film consisting of an $SiN_x$ film and an $SiO_2$ film is formed to have thickness of about 500 nm to about 700 nm and to cover the TFT and the auxiliary capacitance. A source electrode 7 and a drain electrode 8 are formed on the interlayer insulating film 6 via the contact holes 6a and 6b in such a manner as to be electrically connected to the source region 2a and the drain region 2b, respectively. Each of the source electrode 7 and the drain electrode 8 consists of an Mo layer, an Al layer and an Mo layer from below to above in a thickness of about 400 nm to about 800 nm. As shown in FIG. 1, the drain electrode 8 is connected to a drain line 8a.

As shown in FIG. 5, a planarization film 9 having openings 9a and 9b, each of which is inclined at a predetermined angle at the side surface thereof, is formed and is made of an acrylic resin in a thickness of about 2 μm to about 3 μm in a projecting cross section on the interlayer insulating film 6. As shown in FIG. 1, the opening 9a of the planarization film 9 is formed into a square in a plan view in such a manner as to surround the transmissive region 60b. The opening 9b is formed in a region corresponding to the source electrode 7. The planarization film 9 is one example of "an insulating film" according to the present invention.

Figure 2:
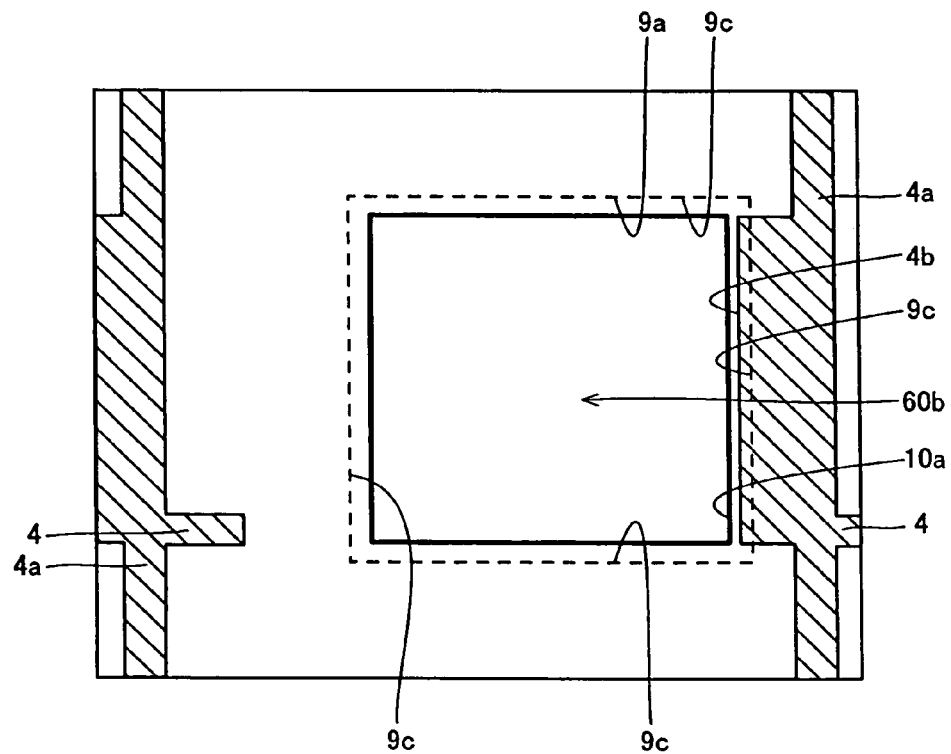
FIG. 2 is a plan view showing a region, in which a gate line is formed, in the display in the first preferred embodiment shown in FIG. 1.
Figure 3:
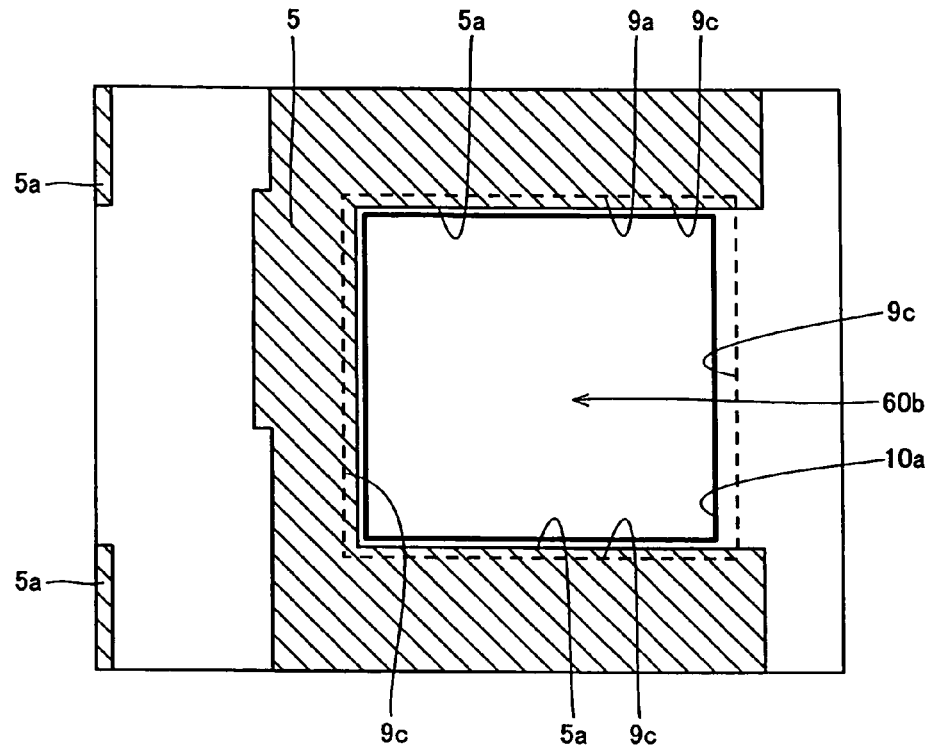
FIG. 3 is a plan view showing a region, in which an auxiliary capacitance line is formed, in the display in the first preferred embodiment shown in FIG. 1.
Figure 4:
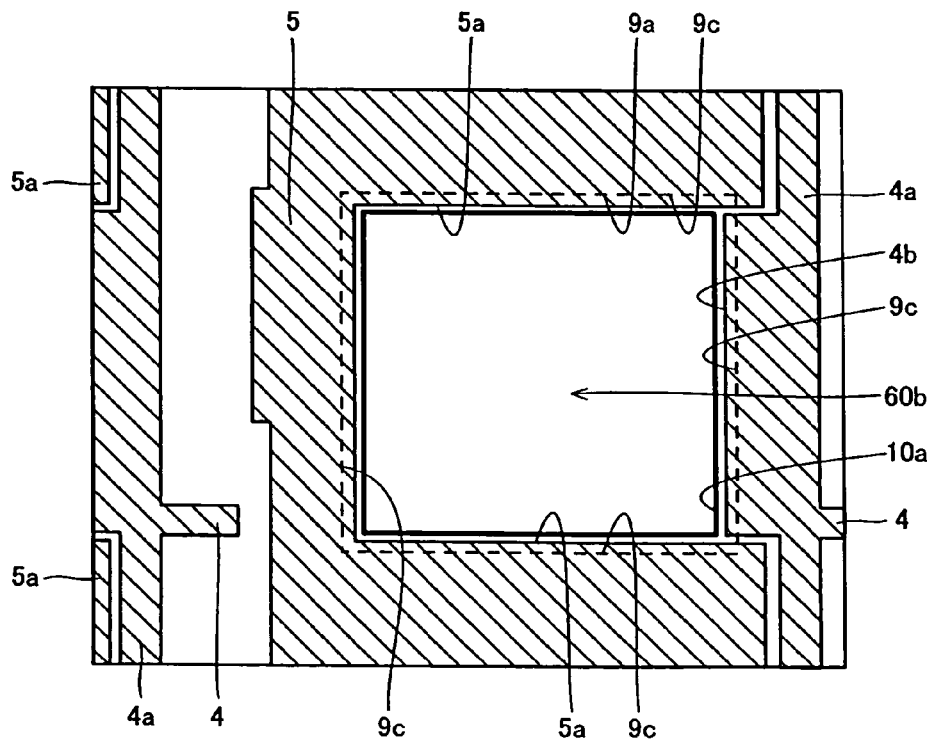
FIG. 4 is a plan view showing the regions, in which the gate line and the auxiliary capacitance line are formed, in the display in the first preferred embodiment shown in FIG. 1.

In the first preferred embodiment, as one example of "a light shielding film" according to the present invention, the gate line 4a and the auxiliary capacitance line 5 serve as a light shielding film. As shown in FIG. 2, a side end 4b of the gate line 4a is formed in such a manner as to extend toward the transmissive region 60b beyond a region in which one of side ends 9c of the opening 9a is located. Furthermore, as shown in FIG. 3, a side end 5a of the auxiliary capacitance line 5 is formed in such a manner as to extend toward the transmissive region 60b beyond a region in which the residual three of the side ends 9c are located. The gate line 4a and the auxiliary capacitance line 5 such formed as described above function as a light shielding film for suppressing a region in which the side end 9c of the opening 9a of the planarization film 9 is formed from being irradiated with a turbulently reflected light beam when the planarization film 9 made of the acrylic resin is exposed to the light beam in a fabricating process, described later. Incidentally, in the first preferred embodiment, as shown in FIG. 4, a part of the side end 4b of the gate line 4a located in the vicinity of the auxiliary capacitance line 5 is formed not beyond the region in which the side end 9c is located such that the gate line 4a and the auxiliary capacitance line 5 are electrically disconnected from each other. Furthermore, the auxiliary capacitance line 5 is commonly used in the pixels along each of signal lines.

Additionally, as shown in FIG. 5, a reflective electrode 10 having an opening 10a is formed in a region corresponding to the reflective region 60a on the planarization film 9 in such a manner as to be electrically connected to the source electrode 7 via the opening 9b and extend along the upper surface of the planarization film 9 and the side surface of the opening 9a. Furthermore, a predetermined interval is formed in a part of a region between the reflective electrode 10 and the gate line 4a in a plan view, as shown in FIG. 1. Moreover, the reflective electrode 10 is made of AlNd in a thickness of about 80 nm to about 200 nm. The reflective electrode 10 is one example of "a reflecting film" according to the present invention.

A transparent electrode 11 is made of IZO (i.e., indium zinc oxide) in a thickness of about 100 nm to about 150 nm on the interlayer insulating film 6 located in the reflective electrode 10 and the opening 10a. The transparent electrode 11 and the reflective electrode 10 constitute a pixel electrode. The transparent electrode 11 is one example of "a first electrode" according to the present invention.

Moreover, a glass substrate 12 is disposed at a position opposite to the glass substrate 1. A color filter 13, which exhibits each color of red, green and blue, is formed on the glass substrate 12. Furthermore, a black matrix 14 for preventing any leakage of the light beam from the pixels is formed in a region corresponding to the pixels on the glass substrate 12. An opposite electrode 15 is made of IZO in a thickness of about 100 nm to about 150 nm on the color filter 13 and the black matrix 14. Here, the opposite electrode 15 is one example of "a second electrodes" according to the present invention.

Furthermore, an aligning film, not shown, is formed on each of the transparent electrode 11 and the opposite electrode 15. Between the two aligning films is filled a liquid crystal layer 16. Here, the distances between a pixel electrode and an opposite electrode in the reflective region 60a and the transmissive region 60b are made different from each other by forming the opening 9a in the region corresponding to the transmissive region 60b of the planarization film 9. Specifically, the thickness of the liquid crystal layer 16 in the reflective region 60a is made half of the thickness of the liquid crystal layer 16 in the transmissive region 60b. Consequently, the light beam passes twice the liquid crystal layer 16 in the reflective region 60a while the light beam passes only once the liquid crystal layer 16 in the transmissive region 60b. Therefore, the lengths of optical paths in the reflective region 60a and the transmissive region 60b become equal to each other by making the thickness of the liquid crystal layer 16 in the reflective region 60a half of the thickness of the liquid crystal layer 16 in the transmissive region 60b. As a result, it is possible to reduce variations in displaying quality in the case of transmissive display and reflective display.

As described above, in the first preferred embodiment, the side end 4b and the side end 5a are formed to extend toward the transmissive region 60b beyond the region, in which the side end 9c is located, thereby making it possible to suppress the region, in which the side end 9c is formed, from being irradiated with the light beam, which transmits the glass substrate 1 and is turbulently reflected on the substrate stage, in the exposing process for forming the opening 9a by the effect of the gate line 4a and the auxiliary capacitance line 5. As a consequence, it is possible to suppress a part of the side end 9c from being removed in developing the image, and therefore, it is possible to suppress the formation of a recess due to the turbulently reflected light beam in the exposing device. Consequently, a recess due to the turbulently reflected light beam during the exposure to the light beam can be suppressed from being formed at the portion of the reflecting electrode 10 in the vicinity of the side end 9c, thereby suppressing an image reflecting a recess from being displayed on a screen. As a result, it is possible to suppress the degradation of the displaying quality.

Furthermore, in the first preferred embodiment, the gate line 4a and the auxiliary capacitance line 5 can be formed to have the function of the light shielding film, thereby obviating the necessity of addition of a process for forming a light shielding film, so as to prevent the fabricating process from being complicated.

Moreover, in the first preferred embodiment, the reflective electrode 10 is formed to extend along the upper surface of the planarization film 9 and the side surface of the opening 9a of the planarization film 9, thereby easily enlarging the reflective region 60a.

Next, referring to FIGS. 1 to 12, explanation will be made on the fabricating process in the transflective type liquid crystal display in the first preferred embodiment.

Figure 6:
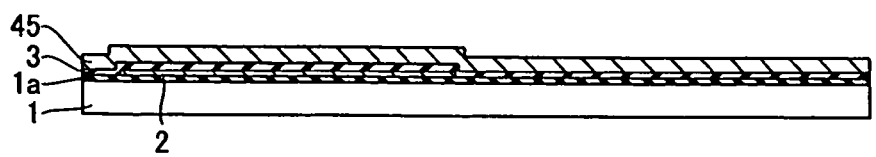
FIGS. 6 to 12 are cross-sectional views illustrating the fabricating process of the display in the first preferred embodiment according to the present invention.

As shown in FIG. 6, the active layer 2 made of non single crystal silicon or amorphous silicon in a thickness of about 30 nm to about 50 nm is formed in the predetermined region on the glass substrate 1 provided with the buffer layer 1a made of the $SiN_x$ film and the $SiO_2$ film. Subsequently, the gate insulating film 3 is formed of the laminate film consisting of the $SiN_x$ film and the $SiO_2$ film in a thickness of about 80 nm to about 150 nm in such a manner as to cover the active layer 2. Thereafter, an Mo layer 45 is formed over the entire surface in a thickness of about 200 nm to about 250 nm.

Figure 7:
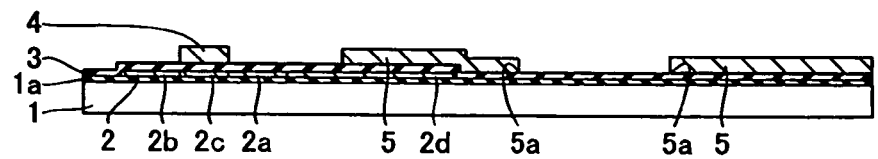

Subsequently, the gate line 4a including the gate electrode 4 and functioning also as the light shielding film (see FIG. 1) and the auxiliary capacitance line 5 functioning also as the light shielding film are formed by patterning the Mo layer 45 by the use of photolithography and dry etching, as shown in FIG. 7. Specifically, the side end 4b of the gate line 4a (see FIG. 2) is formed to extend toward the transmissive region 60b beyond the region in which one of the side ends 9c of the opening 9a at the planarization film 9, described later, is located. Furthermore, the side end 5a of the auxiliary capacitance line 5 (see FIG. 3) is formed to extend toward the transmissive region 60b beyond the region in which the residual three of the side ends 9c are located. Incidentally, in order to electrically disconnect the gate line 4a and the auxiliary capacitance line 5 from each other, as shown in FIG. 4, a part of the side end 4b located in the vicinity of the auxiliary capacitance line 5 is formed not beyond the region in which the side end 9c is located.

Thereafter, impurity ions are implanted by using the gate electrode 4 as a mask, thereby forming the source region 2a and the drain region 2b. The portion between the source region 2a and the drain region 2b serves as the channel region 2c.

Figure 8:
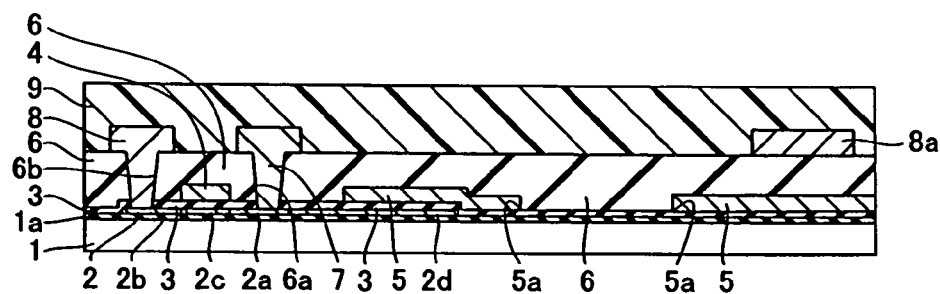

Next, as shown in FIG. 8, the interlayer insulating film 6 is formed of the laminate film consisting of the $SiO_2$ film and the $SiN_x$ film in a thickness of about 500 nm to about 700 nm over the entire surface. Thereafter, the contact holes 6a and 6b are formed in the regions corresponding to the source region 2a and the drain region 2b in the interlayer insulating film 6, respectively. The source electrode 7 and the drain electrode 8, each of which consists of the Mo layer, the Al layer and the Mo layer from below to above, are formed via the contact holes 6a and 6b in a thickness of about 400 nm to about 800 nm in such a manner as to be electrically connected to the source region 2a and the drain region 2b, respectively. At this time, the drain line 8a is also formed of the same layer as that of the drain electrode 8 (see FIG. 1). Thereafter, the planarization film 9 made of the acrylic resin is formed in a thickness of about 2 μm to about 3 μm over the entire surface.

Figure 9:
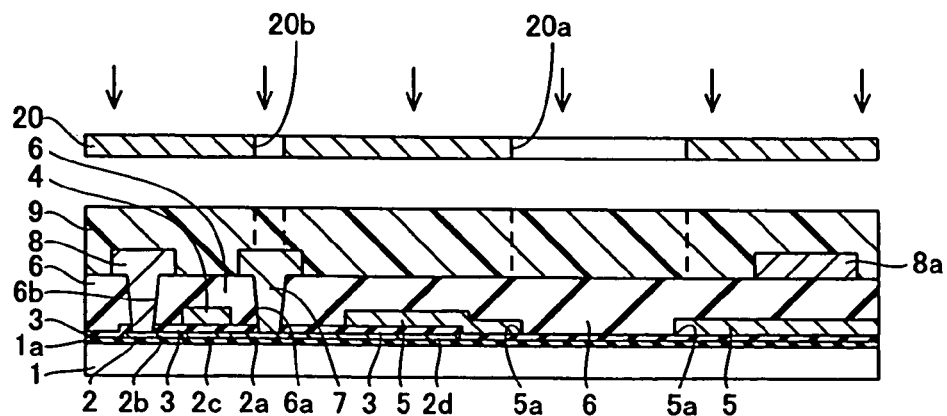
Figure 10:
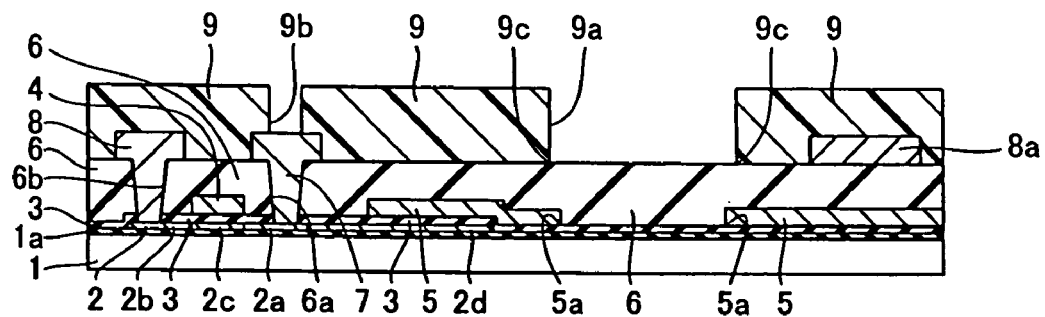

Subsequently, as shown in FIG. 9, the glass substrate 1 is placed on the substrate stage, not shown, in the exposing device. Furthermore, a photo mask 20 having openings 20a and 20b is disposed in each of the region corresponding to the transmissive region 60b (see FIG. 1) and the region corresponding to the source electrode 7 above the planarization film 9. As shown in FIG. 10, the openings 9a and 9b are formed in the region corresponding to the transmissive region 60b and the region corresponding to the source electrode 7, respectively, by development after the predetermined portion of the planarization film 9 is exposed to the light beam via the photo mask 20. At this time, the light beam turbulently reflected on the substrate stage in the exposing process is shielded by the gate line 4a (see FIG. 1) and the auxiliary capacitance line 5, thereby suppressing the region in which the side end 9c of the opening 9a at the planarization film 9 is formed from being irradiated with the light beam. Thus, it is possible to suppress a recess from being formed at the side end 9c.

Figure 11:
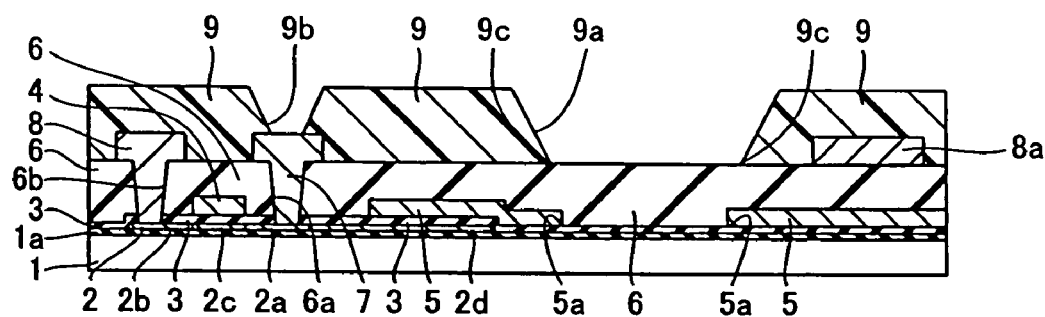

Next, as shown in FIG. 11, the inclination is formed at the predetermined angle at the side surface of each of the openings 9a and 9b at the planarization film 9 by heat treatment at about 200° C. for about 30 min.

Figure 12:
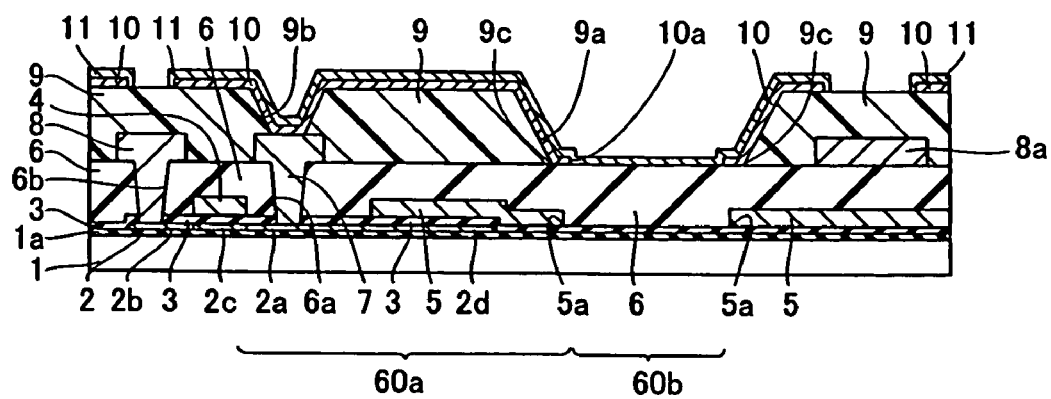

Subsequently, an AlNd film, not shown, is formed in a thickness of about 80 nm to about 200 nm over the entire surface, and then, a predetermined region of the AlNd film is removed. Consequently, as shown in FIG. 12, the reflective electrode 10 is formed to have the opening 10a in the region corresponding to the transmissive region 60b and to be electrically connected to the source electrode 7 via the opening 9b and extend along the upper surface of the planarization film 9 and the side surface of the opening 9a. In this manner, there are provided the reflective region 60a having the reflective electrode 10 formed thereon and the transmissive region 60b having no reflective electrode 10 formed thereon. Thereafter, the transparent electrode 11 made of IZO and the aligning film, not shown, are formed in sequence in a thickness of about 100 nm to about 150 nm on the reflective electrode 10 and on the interlayer insulating film 6 corresponding to the opening 10a.

Finally, the color filter 13 is formed on the glass substrate (i.e., the opposite substrate) 12 disposed opposite to the glass substrate 1, and further, the black matrix 14 is formed in the region corresponding to the pixels on the glass substrate 12. Next, the opposite electrode 15 made of IZO and the aligning film, not shown, are formed in sequence in a thickness of about 100 nm to about 150 nm on the color filter 13 and the black matrix 14. Finally, the liquid crystal layer 16 is filled between the aligning film on the side of the glass substrate 1 and the aligning film on the side of the glass substrate 12, thus forming the liquid crystal display shown in FIG. 5.

Figure 13:
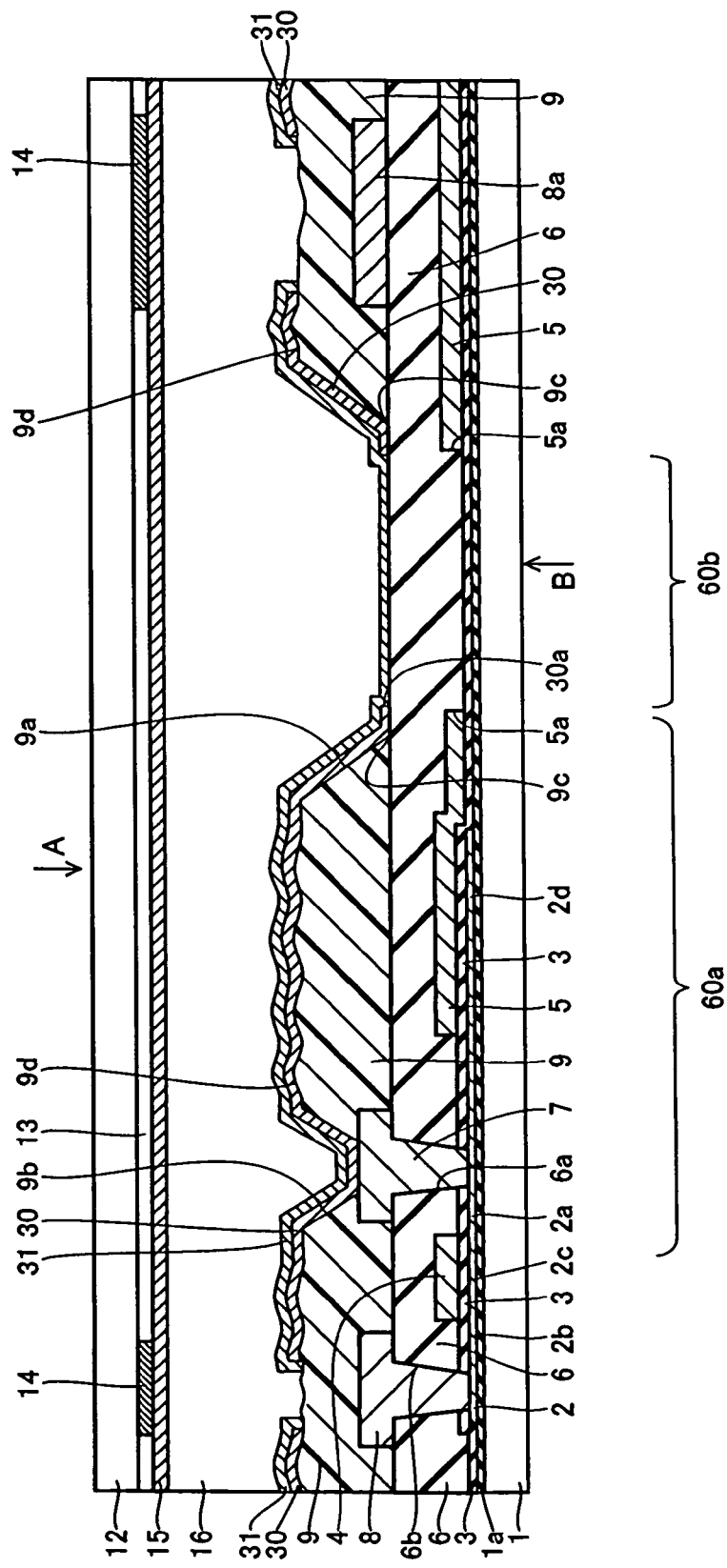
FIG. 13 is a cross-sectional view showing the structure of the display in a first modification of the first preferred embodiment.

Referring to FIG. 13, a liquid crystal display in a first modification of the first preferred embodiment is different from that in the first preferred embodiment in that a finely uneven diffusion region 9d is formed at the upper surface of the planarization film 9. A reflective electrode 30 and a transparent electrode 31 located in a region corresponding to the diffusion region 9d also are formed into a shape reflecting the finely uneven shape of the diffusion region 9d. Consequently, the light beam incident into the reflective region 60a can be diffused, thus further enhancing the displaying quality in the case of the reflective display.

Figure 14:
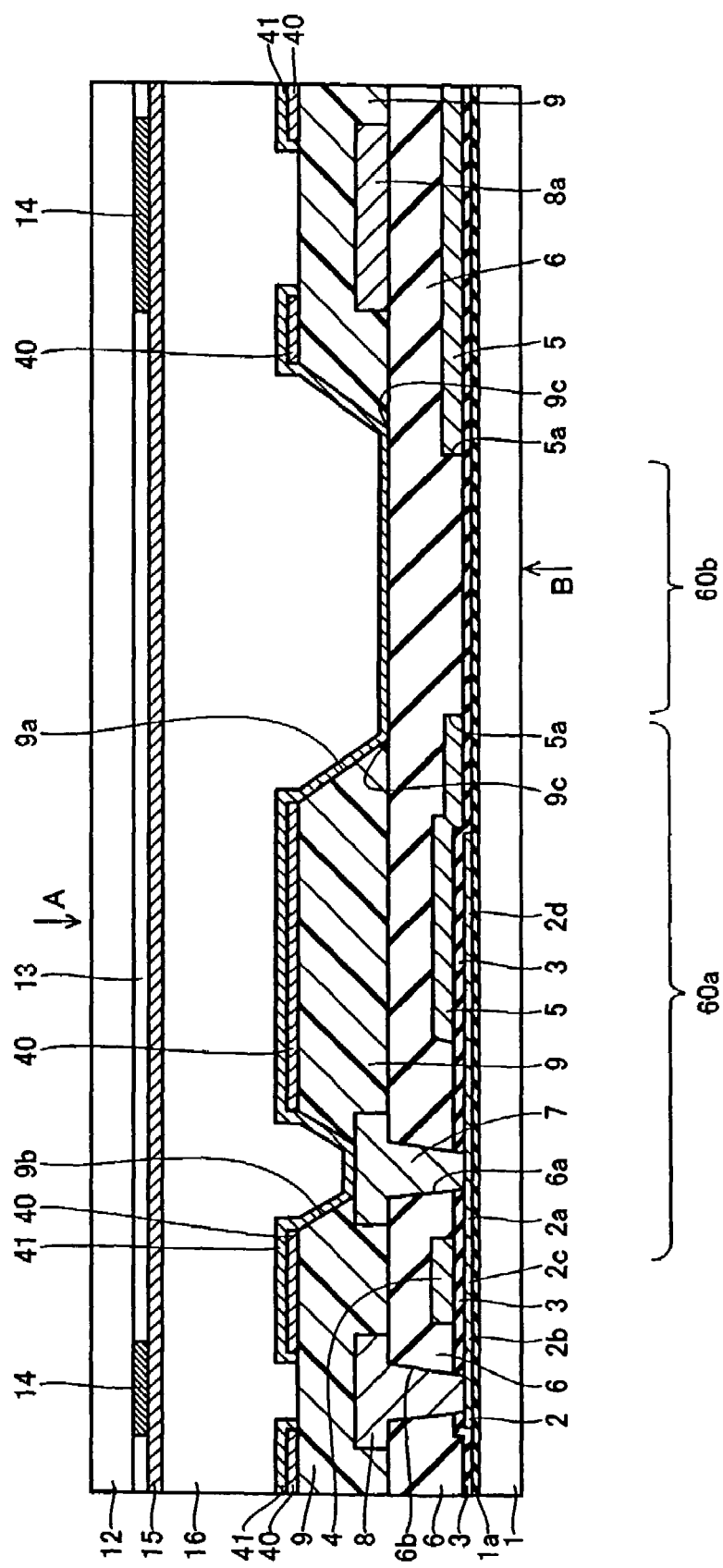
FIG. 14 is a cross-sectional view showing the structure of the display in a second modification of the first preferred embodiment.

Referring to FIG. 14, a liquid crystal display in a second modification of the first preferred embodiment is different from that in the first preferred embodiment in that no reflective electrode 40 is formed at the inclined side surface of the opening 9a while a reflective electrode 40 is formed only in a predetermined region at the upper surface of the planarization film 9. A transparent electrode 41 is formed on the side surface of the planarization film 9 and the interlayer insulating film 6 located in the transmissive region 60b on the reflective electrode 40. Liquid crystal molecules in the vicinity of the inclined side surface of the opening 9a are liable to be misaligned. However, the formation of the reflective electrode 40 only at the upper surface of the planarization film 9 can prevent the light beam incident into the reflective region 60a from being reflected on the inclined side surface of the opening 9a. Consequently, it is possible to suppress the reflected light beam from passing the liquid crystal layer 16 located at the inclined side surface, thus suppressing the degradation of a contrast.

Second Embodiment

Figure 15:
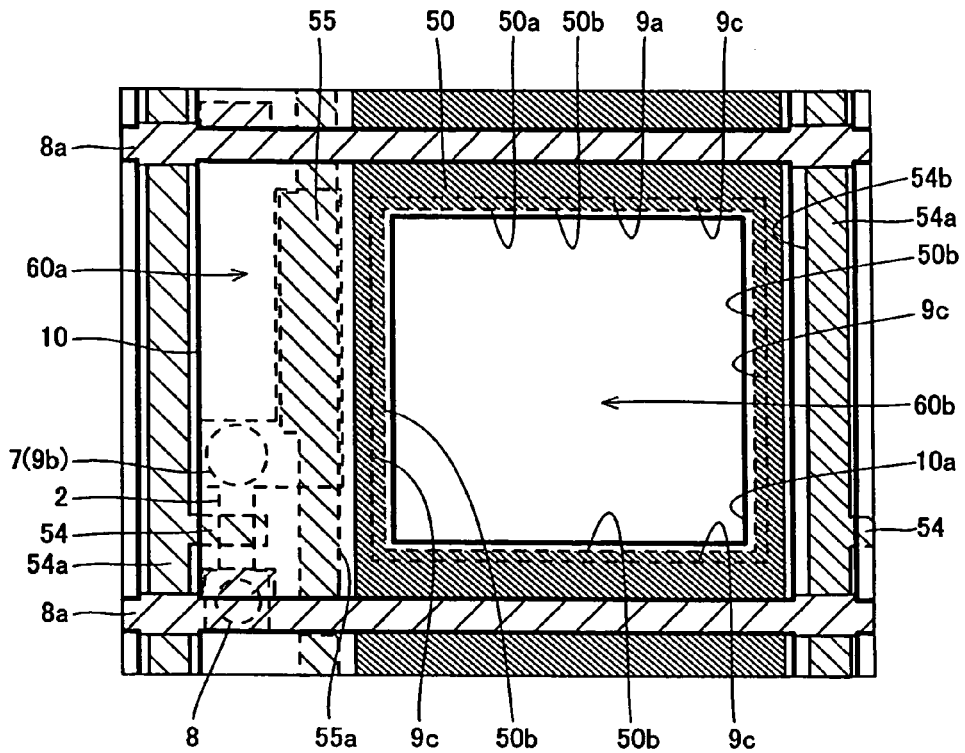
FIG. 15 is a plan view showing the structure of a transflective type liquid crystal display in a second preferred embodiment according to the present invention.

Referring to FIG. 15, a second preferred embodiment is different from the first preferred embodiment in that a black matrix film 50 is formed also on a glass substrate, not shown, or between the glass substrate and a buffer layer, not shown. An opening 50a is formed into a square in a plan view in a region corresponding to a transmissive region 60b on the black matrix film 50 in such a manner as to surround the transmissive region 60b. Moreover, a side end 50b of the opening 50a is formed in such a manner as to extend toward the transmissive region 60b beyond a region in which a side end 9c of an opening 9a of a planarization film 9 is located. That is to say, the black matrix film 50 also functions as a light shielding film for suppressing a region in which the side end 9c is formed from being irradiated with a turbulently reflected light beam in a process for exposing the planarization film 9 in addition to a normal light shielding function between pixels.

Unlike in the first preferred embodiment, since a gate line 54a of a gate electrode 54 and an auxiliary capacitance line 55 need not function as light shielding films, a side end 54b of the gate line 54a and a side end 55a of the auxiliary capacitance line 55 are not formed in such a manner as to extend toward the transmissive region 60b beyond the region in which the side end 9c is located. Moreover, a predetermined space is formed between a reflective electrode 10 and the gate line 54a, as viewed in a plan view. Furthermore, an insulating film, not shown, is interposed between the black matrix film 50 and an active layer 2 in the case where the black matrix film 50 is formed of a conductor made of metal etc. The other configuration in the second preferred embodiment is the same as that in the first preferred embodiment.

As described above, since the film functioning as the light shielding film is constituted of only the black matrix film 50 in the second preferred embodiment, the light shielding film (i.e., the black matrix film 50) can be formed to extend toward the transmissive region 60b beyond the entire region in which the side end 9c of the opening 9a at the planarization film 9 is located. In this manner, the light shielding film (i.e., the black matrix film 50) always exists under the region in which the side end 9c is located, unlike the first preferred embodiment. As a result, it is possible to further suppress the region, in which the side end 9c is formed, from being irradiated with the turbulently reflected light beam in the exposing process for forming the opening 9a. As a consequence, it is possible to further suppress a part of the side end 9c from being removed, and therefore, it is possible to further suppress a recess due to the turbulently reflected light beam from being formed at the side end 9c, thereby further suppressing an image reflecting a recess at the reflective electrode 10 from being displayed on a screen. As a result, it is possible to further suppress the degradation of the displaying quality.

Furthermore, in the second preferred embodiment, the normal black matrix film 50 for shielding the light between the pixels can also function as the light shielding film for suppressing the turbulent reflection of the light beam during the exposure of the planarization film 9 to the light beam, thereby obviating the necessity of addition of a process for forming a light shielding film, so as to prevent the fabricating process from being complicated.

It is to be understood that the particular preferred embodiments given above should be illustrative not limitative in regard to every points. Therefore, the scope of the present invention is not described in the above-described preferred embodiments but claimed by claims. Furthermore, the present invention includes all modifications and alterations in meanings and scopes equivalent to those claimed in claim according to the present invention.

The present invention is applicable to a liquid crystal display in addition to the liquid crystal display of an active matrix type using the thin film transistor (TFT). For example, liquid crystal displays include a liquid crystal display of a passive matrix type and a liquid crystal display of a segment type. Additionally, the present invention is applicable to a display in addition to the liquid crystal display.

Furthermore, the light shielding film may extend at least the side end of the opening of the planarization film.

Figure 16:
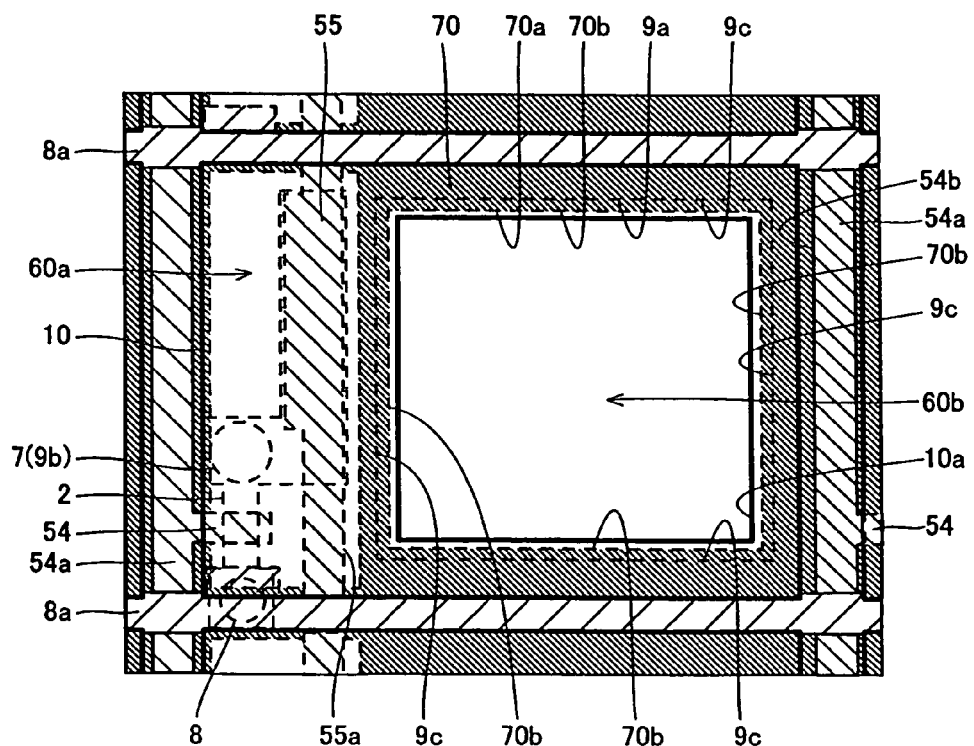
FIG. 16 is a plan view showing the structure of the display in a modification of the second preferred embodiment.
Figure 17:
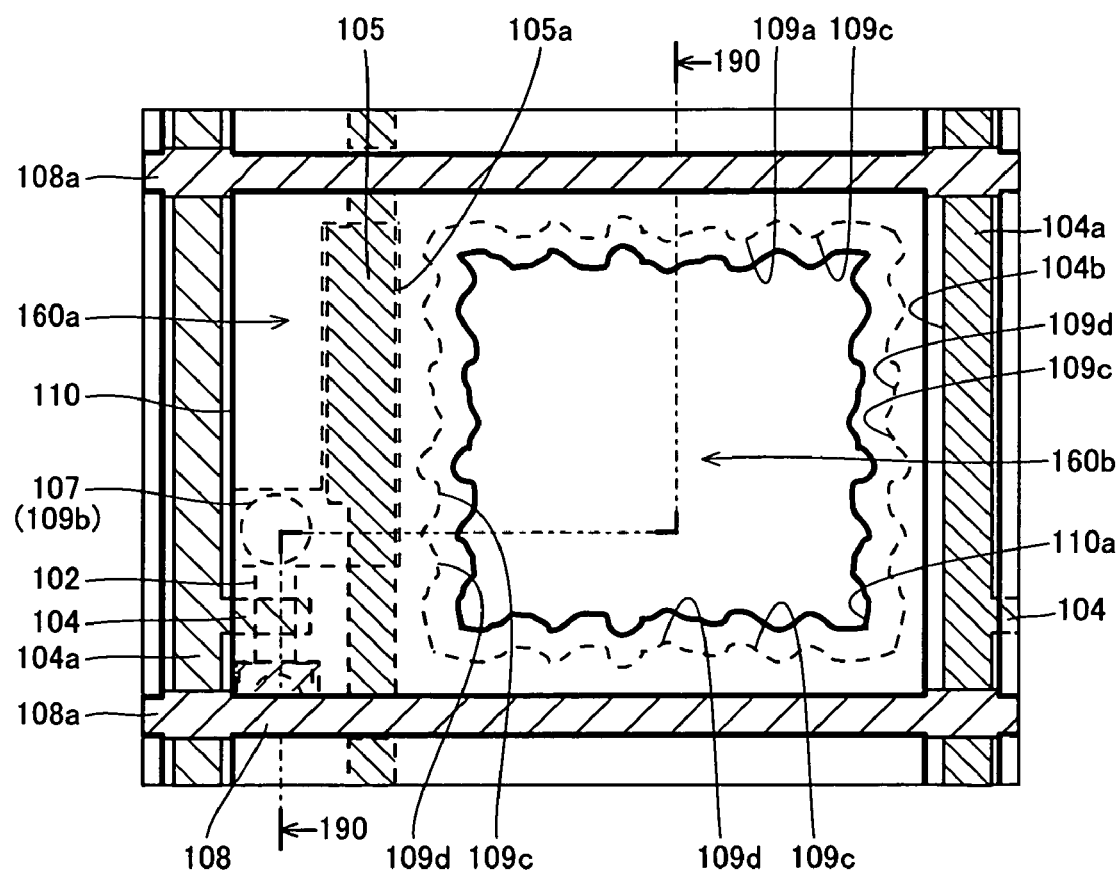
FIG. 17 is a plan view showing the structure of a transflective type liquid crystal display having a projecting insulating film (i.e., a planarization film) in the prior art.
Figure 18:
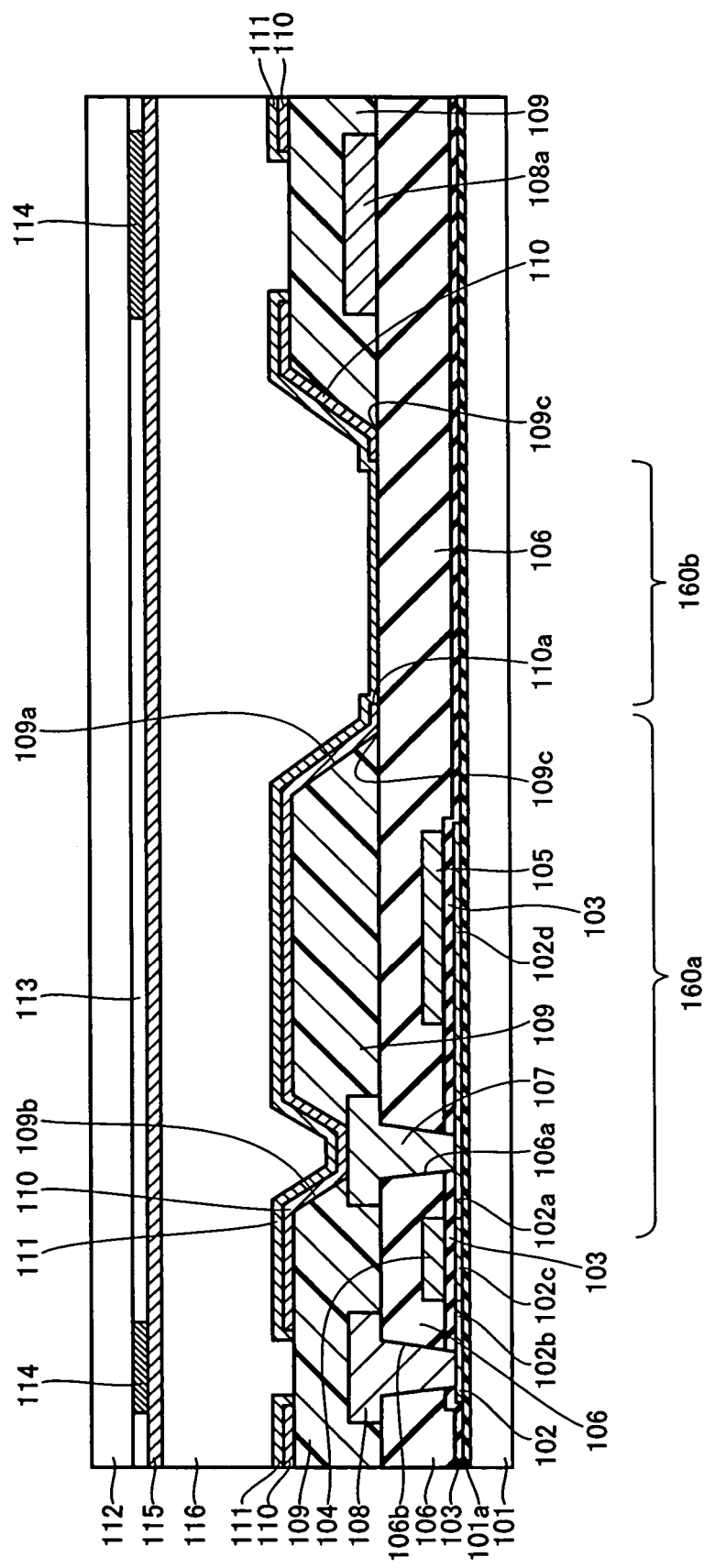
FIG. 18 is a cross-sectional view, taken along a line 190—190, showing the display in the prior art shown in FIG. 17.

Otherwise, the reflective electrode may be formed to overlap with the gate line such that no clearance is formed between the reflective electrode and the gate line. Or, as shown in FIG. 16, a black matrix 70 may be formed in such a manner as to extend up to the gate line 54a such that no clearance is formed between the reflective electrode 10 and the gate line 54a. In this manner, it is possible to suppress a light beam emitted from a backlight from being leaked from between the reflective electrode 10 and the gate line 54a.

Alternatively, the light shielding film may be constituted of either one of the gate line and the auxiliary capacitance line.

Or, a transparent substrate made of quartz or plastic may be used in place of the glass substrate. No buffer layer may be formed on the substrate.

Otherwise, there may be used a transparent electrode formed of a transparent conductor (including a so-called semi-transparent member) made of ITO (i.e., indium tin oxide) in place of IZO.

Alternatively, a recess corresponding to the opening 9a may be formed at the planarization film.

What is claimed is:

1. A display having a reflective region and a transmissive region comprising:
    a projecting insulating layer formed in a region corresponding to said reflective region on a substrate; and
    a light shielding layer formed under said projecting insulating layer and formed to extend at least up to a region in which a side end of said projecting insulating layer is located.

2. A display according to claim 1, wherein said projecting insulating layer is formed to surround said transmissive region, as viewed in a plan view; and
    said light shielding layer is formed to extend up to said transmissive region beyond a region in which the side end of said projecting insulating layer is located.

3. A display according to claim 1, further comprising:
    a thin film transistor formed between said projecting insulating layer and said substrate and having a pair of source/drain regions and a gate electrode;
    wherein said light shielding layer is formed of the same layer as that constituting said gate electrode.

4. A display according to claim 1, further comprising:
    a storage capacitance having a storage capacitance line;
    wherein said light shielding layer is formed of the same layer as that constituting the storage capacitance line of said storage capacitance.

5. A display according to claim 1, further comprising:
    a black matrix layer formed between said projecting insulating layer and said substrate;
    wherein said light shielding layer is formed of the same layer as that constituting said black matrix layer.

6. A display according to claim 5, further comprising:
    a thin film transistor formed between said projecting insulating layer and said substrate and having a pair of source/drain regions and a gate electrode, to which a gate line is connected;
    wherein said light shielding layer formed of the same layer as that constituting said black matrix layer is formed to overlap with said gate line.

7. A display according to claim 1, wherein said projecting insulating layer has a finely uneven diffusion region at the upper surface thereof.

8. A display according to claim 1, wherein a side end of said projecting insulating layer has an inclined side surface; and
    there is further provided a reflecting film formed not at the side surface of said projecting insulating layer but at the upper surface of said projecting insulating layer.

9. A display according to claim 1, wherein a side end of said projecting insulating layer has an inclined side surface; and
    there is further provided a reflecting film formed at the upper surface and side surface of said insulating layer.

10. A display according to claim 1, further comprising:
a thin film transistor formed between said projecting insulating layer and said substrate and having a pair of source/drain regions and a gate electrode; and
a storage capacitance having a storage capacitance line;
wherein said light shielding layer is formed of a layer constituting said gate electrode and a layer constituting said storage capacitance line.

11. A display according to claim 10, wherein the layer constituting said gate electrode and the layer constituting said storage capacitance line are formed of the same layer.

12. A display having a substrate, a projecting insulating layer on said substrate, a first electrode on said substrate, a second electrode on said first electrode and a liquid crystal layer held between said first electrode and said second electrode, the display comprising:
a transmissive region, in which said first electrode is made of transparent material, and said first electrode and said second electrode are separated from each other with a first distance;
a reflective region including a reflector on said projecting insulating layer, in which said first electrode and said second electrode are separated from each other with a second distance shorter than said first distance due to said projecting insulating layer; and
a light shielding layer interposed between said substrate and said projecting insulating layer,
said light shielding layer extending at least up to an end on the side of said transmissive region of said projecting insulating layer.

13. A display according to claim 12, wherein said projecting insulating layer is formed to surround said transmissive region, as viewed in a plan view; and
said light shielding layer is formed to extend up to said transmissive region beyond a region in which the side end of said projecting insulating layer is located.

14. A display according to claim 12, further comprising:
a thin film transistor formed between said projecting insulating layer and said substrate and having a pair of source/drain regions and a gate electrode,
wherein said light shielding layer is formed of the same layer as that constituting said gate electrode.

15. A display according to claim 12, further comprising:
a storage capacitance having a storage capacitance line,
wherein said light shielding layer is formed of the same layer as that constituting the storage capacitance line of said storage capacitance.

16. A display according to claim 12, further comprising:
a black matrix layer formed between said projecting insulating layer and said substrate,
wherein said light shielding layer is formed of the same layer as that constituting said black matrix layer.

17. A display according to claim 16, further comprising:
a thin film transistor formed between said projecting insulating layer and said substrate and having a pair of source/drain regions and a gate electrode, to which a gate line is connected,
wherein said light shielding layer formed of the same layer as that constituting said black matrix layer is formed to extend up to said gate line.

18. A display according to claim 12, wherein said projecting insulating layer has a finely uneven diffusion region at the upper surface thereof.

19. A display according to claim 12, wherein a side end of said projecting insulating layer has an inclined side surface; and
there is further provided a reflecting film formed not at the side surface of said projecting insulating layer but at the upper surface of said projecting insulating layer.

20. A display according to claim 12, wherein a side end of said projecting insulating layer has an inclined side surface; and
there is further provided a reflecting film formed at the upper surface and side surface of said insulating layer.

21. A display according to claim 12, further comprising:
a thin film transistor formed between said projecting insulating layer and said substrate and having a pair of source/drain regions and a gate electrode; and
a storage capacitance having a storage capacitance line,
wherein said light shielding layer is formed of a layer constituting said gate electrode and a layer constituting said storage capacitance line.

22. A display according to claim 21, wherein the layer constituting said gate electrode and the layer constituting said storage capacitance line are formed of the same layer.

23. A display according to claim 12, wherein said second distance in said reflective region is substantially half of said first distance in said transmissive region.

* * * * *